March 29, 1960  M. F. SPEARS  2,930,232
DEVICE FOR MANIFESTING THERMAL BOUNDARIES
Filed July 20, 1955  2 Sheets-Sheet 1
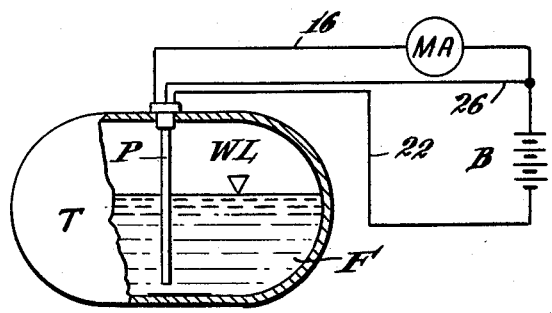
Fig. 1
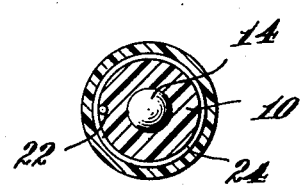
Fig. 4
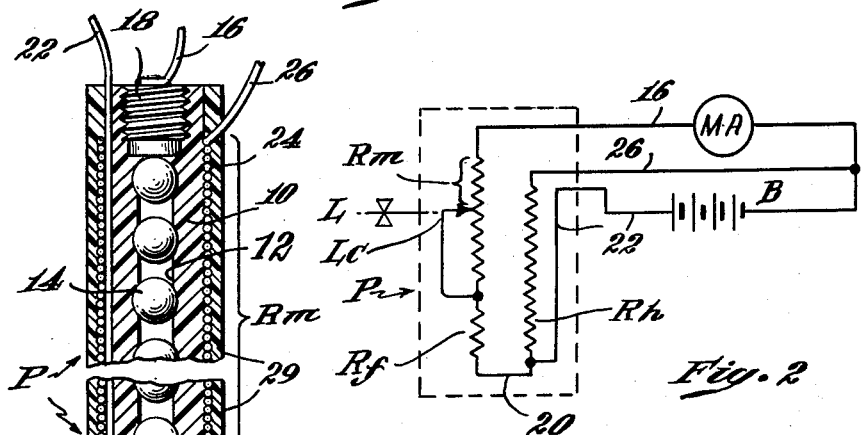
Fig. 2
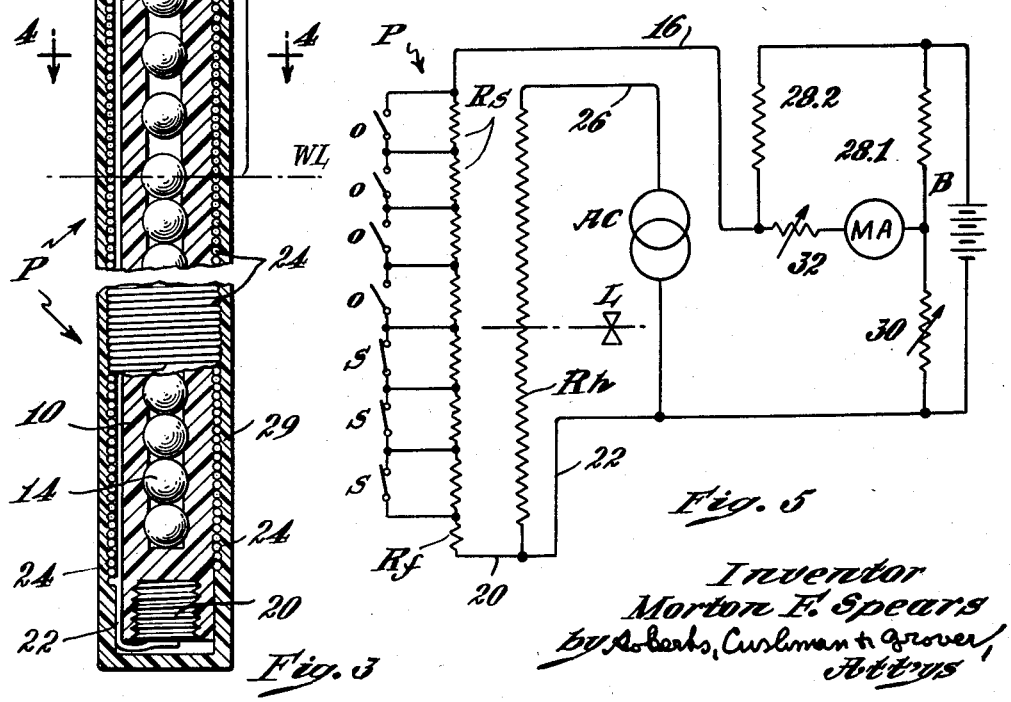
Fig. 3
Fig. 5
Inventor
Morton F. Spears
by Roberts, Cushman & Grover
Attys March 29, 1960 — M. F. SPEARS — 2,930,232
DEVICE FOR MANIFESTING THERMAL BOUNDARIES
Filed July 20, 1955 — 2 Sheets-Sheet 2
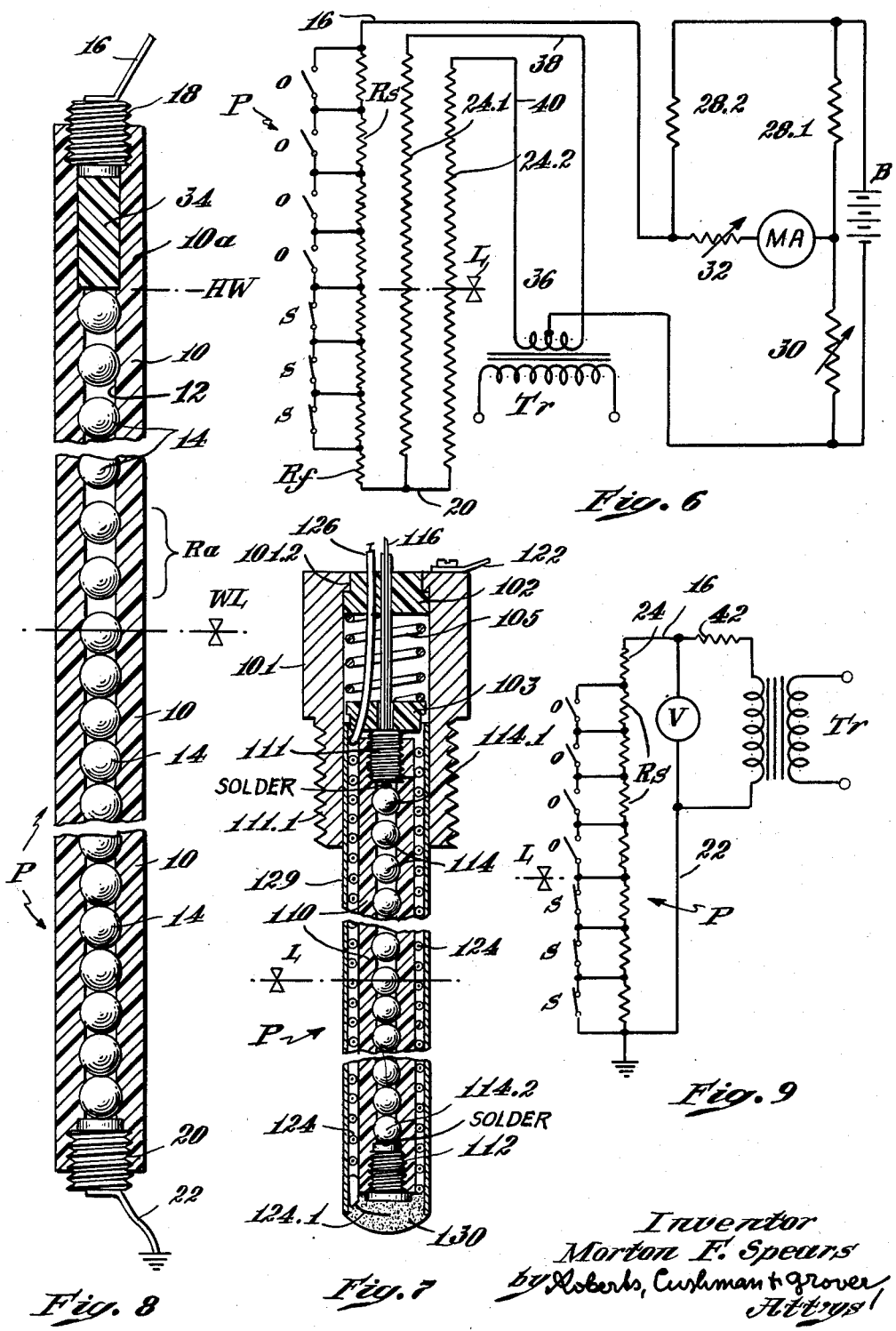
Inventor
Morton F. Spears
by Roberts, Cushman & Grover
Attys United States Patent Office 2,930,232
Patented Mar. 29, 1960

2,930,232
DEVICE FOR MANIFESTING THERMAL BOUNDARIES

Morton F. Spears, Westwood, Mass.

Application July 20, 1955, Serial No. 523,325

17 Claims. (Cl. 73—295)

This invention relates to a device for manifesting by way of an electrical response boundaries between zones of different heat dependent characteristics. The present application is a continuation-in-part of my copending application Serial No. 449,948, filed on August 16, 1954, now abandoned.

One of the principal objects of the invention is to provide apparatus for detecting, indicating and measuring dividing regions, discontinuities, gradients, or other distinctions between zones of different heat dissipation or capacity, or temperature.

A principal specific object is to detect the changes in level of a mass of fluid material, for instance the liquid in a container, for conveniently indicating or recording such changes at a remote point or for controlling some operation responsively thereto.

The following summary of the invention indicates its nature and substance, for obtaining the above objects, as a device for manifesting by way of an electrical response a boundary within a substance or between substances, which boundary establishes two adjacent zones of different thermal characteristics on respective sides of the boundary, comprising an elongated probe member (such as a tube), carrying a series of small bodies, herein also referred to as masses (such as balls), each of which is peripherally fixed to a wall of the elongated member (in the case of balls in a tube frictionally, or by way of indentations of a tube of an inside dimension slightly smaller than the ball diameter), the coefficients of linear thermal expansion of the elongated probe member and of the bodies therein being substantially different so that the bodies will touch each other throughout that section of the probe member which extends within one of the zones in an ambient substance in a certain heat determined state, whereas the bodies will be separated throughout a remaining section of the member which extends within the other zone in an ambient substance in a different heat determined state, so that the ratio of the respective sections is determined by the boundary between the two zones; the lengths of these sections and hence the location of the boundary can be found by measuring the ratio of the electric resistances over the respective sections as determined by the number of bodies which are separated or touch each other, respectively. The temperature differential and hence the different status of expansion of respective sections of the probe member is derived from an external heat source, either purposely built into or onto the device, or constituted by the ambients themselves.

In an important aspect of the invention the elongated member is a tube of plastic material of the halide substituted ethylene polymer type, sometimes with admixtures making such material especially suitable for the purpose at hand, and the bodies are metal balls. The built-in heat source can consist of one or more coils of resistor wire on or in the tube, or a heating resistance can be built into the probe by using a semi-conductive material for the probe member.

These and other objects, and aspects of the nature of the invention will appear from the herein presented outline of its principles, its mode of operation and its practical possibilities, as exemplified by a description of several typical embodiments illustrating its novel characteristics. These refer to drawings in which Fig. 1 is a diagrammatic view showing the application of an embodiment of the invention as a level indicator to a liquid-containing tank, a wall of the tank being broken away;

Fig. 2 is an electrical diagram indicating the function of the probe of Fig. 1;

Fig. 3 is a vertical section, broken away at two points, through the thermally sensitive probe element of Figs 1 and 2;

Fig. 4 is a section on the line 4—4 of Fig. 3;

Fig. 5 is an electrical diagram indicating the function of a probe according to Figs. 3 and 4, in a measuring bridge;

Fig. 6 is a diagram similar to Fig. 5, but showing a two coil, A.-C. energized heating component;

Fig. 7 is a section similar to Fig. 3, but showing an embodiment with a metal shell protecting a spring mounted probe;

Fig. 8 is a section similar to Fig. 3, but showing an embodiment without separate heater; and Fig. 9 is an electrical diagram illustrating one method of connecting devices such as shown in Fig. 8.

The specific embodiments which are described below are constructed for the main purpose of indicating the height of a fluid column within a container for two substances of different heat dissipation properties, but it will be understood that the invention is not limited to that specific purpose, and the detection of thermal boundaries generally will also be discussed by way of example.

The herein described devices for the manifestation of fluid levels, utilize the higher heat absorbing capacity, whether due to thermal conductivity or greater specific heat, or both, of the fluid, relatively to the overlying medium, usually air or other gas. From one point of view we might say that the response is to a variation in position of the interface between two superposed bodies of fluid. A major field of application of the invention is the indicating of the levels of liquids, as well as semi-liquids including suspensions or loose aggregations of solid particles providing the above-mentioned heat absorbing capacities. In general, neither variations in the overall temperatures of the system nor the chemical potency or electrical properties of the fluids will affect the operation. It should be understood that wherever I refer to "water" or "liquid" and assume that the overlying fluid is air, I include any fluid column of varying altitude, as exemplified by a tank of water, oil, liquid chemical, or nonmiscible gases. In the claims the word "liquid" should be taken in this broader sense.

Referring to the drawings, Fig. 1 shows a tank T, broken away to disclose the body of liquid F of varying height, indicated by level line WL. The sensitive element utilized in my invention is a rod-like body P which is inserted into the liquid transversely to the surface thereof, herein being suspended in fixed vertical position from the upper wall thereof. The length of the rod is such as to extend between the "high water" and "low water" marks. A cable from the upper end of the column extends to a measuring instrument such as a milliammeter MA, and to a source of current here inscribed as a battery B.

Figs. 1 and 2 indicate the general components of the measuring arrangement as follows. As will be explained in detail below, the probe proper constitutes a self-shorting rheostat whose measuring resistance portion $Rm$ varies with the thermal boundary that can thus be indicated by the slide contact $Lc$ that corresponds for example to the level L indicated in Fig. 1. The probe P may further contain a fixed series resistance $Rf$ and a heater resistor $Rh$, such as will be described with reference to Figs. 3 to 5. Figs. 1 and 2 indicate at 16 the connections from $Rm$ and $Rf$ through the ammeter to the battery, at 26 from the heater R*h* to the battery, and at 22 the common return line to the other terminal of the battery. Readings indicative of the depth may be taken from the measuring instrument which, if desired, may have a scale calibrated in terms of liquid levels.

The actual length of the rod is not material to the operation and, in accordance with the application, may vary from an inch to a great many inches. A similar rod might be used as a hand-operated device inserted into the liquid from time to time when a measurement was desired, provided means were provided to determine its position. Ordinarily the rod would extend vertically and the electrical response would vary with the length submerged, as will appear. If it were set at a predetermined angle to the horizontal a trigonometric factor would enter into the measure of the response to the level which suggests further that the rod could be curved to introduce a desired factor in some cases. In the case of a tank, subject to bodily angular displacements, as one on shipboard, the rod should be applied at the center. In the case of semi-liquids in the form of a pile, the surface having a certain angle of repose, it would similarly be placed where the level was a mean.

Referring now to Figs. 3 and 4, the probe P comprises a body 10 of material resistant to the chemical environment, and electrically a semi-conductor. It may conveniently be molded from a body of polytetrafluoroethylene plastic commercially available under the trade designation Teflon or polytrifluorochloroethylene commercially available under the trade designation Kel-F, impregnated with ten or fifteen percent of carbon. Suitable material which can conveniently be impregnated with carbon is at the present time commercially available under the trade designation Rulon. This tubular member has a central bore 12 in which are assembled a series of small masses or bodies 14 of material of relatively high electrical conductivity. These are conveniently spheres as shown, which in practice may be steel ball bearings silver plated. At least some of these masses, and preferably all of them, should be in frictional engagement with the wall of the bore, as can be conveniently provided for by making the bore very slightly smaller in diameter, so that the balls may be forced in and will indent the wall as illustrated. If made from these materials, the coefficient of thermal expansion of the tubular body 10 is greater than that of the masses 14.

The number of the balls 14 is sufficient completely to fill the length of the bore 12 when the parts are at a given, say room temperature and the balls then will be in contact one with another, as shown at the bottom of Fig. 3. If the body 10, however, expands linearly under heat, it having a greater coefficient of thermal expansion than the balls 14, it will move the balls apart, as indicated at the upper portion of Fig. 3. Each pair of balls constitutes a thermostatic switch, and there is a series (geometrically and electrically) of such switches in the complete device. If the balls are ⅛" in diameter there will be eight switches per linear inch of the rod. The semi-conductor 12 forms a high resistance connection in parallel with the switches between the sides thereof.

If voltage is applied to the series of balls in the circuit traced in Figs. 1, 2 and 3 through supply wire 16, contact screw 18, the balls 14 and the tube 10, contact screw 20 and return wire 22, then whenever the balls are in contact as shown at the bottom of Fig. 3, these form a path of least resistance through the rod, no appreciable current passing through the section of the semi-conductor body 10 which surrounds the balls in contact and occurs in Fig. 2 between terminal 20 and point L*c*. For constructional reasons, as seen in Fig. 3, there is a slight thickness of the semi-conducting material between the lowermost ball and the lower contact 20. This fixed series resistance is indicated at R*f* of Fig. 2 and does not affect the operation. If now the entire length of the rod were heated so that the semi-conductor 10 expanded linearly, the balls would be moved apart and the switches formed thereby would be opened, as seen at the top of Fig. 3. The current would then pass through the semi-conductor in a path of much higher resistance. If only certain pairs of the balls were separated, as seen in Fig. 3 above the dot-and-dash line WL (indicative of "water level" or thermal boundary generally), the resistance of the system would be at an intermediate value, being that of a good conductor below WL and a poor conductor above WL as clearly indicated in Fig. 2 by the sections on either side of L*c*.

In accordance with the invention, heat from an external source is applied to the semi-conductor throughout its length but in this use of the invention to a level indicator, the effect of ambient heat on the switches is neutralized in the submerged under-water portion thereof by the heat absorption of the liquid, so that the submerged portion of the semi-conductor 10 is in its contracted state, while in the emersed or out of the water position (since quiescent air is of low specific heat and of relatively low heat conductivity) it is expanded and the balls are separated above the water level. The resistance varies directly with the length of the emersed portion or, in other words, inversely with the water level.

The resistance of the plastic body 10 itself is not temperature sensitive. The negative temperature coefficient of resistance of the carbon offsets the expansion of the plastic resulting in an extremely stable resistance value. Since any portion of the body 10 will be either a very stable low resistance (short-circuited by masses 14) or a very stable high resistance, wide temperature variations of the air or liquid surrounding the rod will not materially alter the resistance values manifested which provides the indication of the liquid level.

Although the current applied through connection 16 flows through the semi-conductor 10 in the locality where the balls are separated and generates heat therein and contributes to maintaining the balls separated, nevertheless a separate heater is required for the detection of boundaries between media of different heat capacity or conductivity but of essentially the same temperature, because otherwise if once the balls were in the closed position, no substantial current would flow in the semi-conductor, but all would flow through the highly conductive connection formed by the series of balls, and they would never move apart.

In the embodiment according to Figs. 3 and 4, the external heater comprises a resistance coil 24, which may be of fine enameled copper wire wound about the semi-conductor 10 and supplied with suitable heating current through the wire 26, the path of the current being then to the common return wire 22. An external protective covering 29 of polytetrafluorethylene plastic is provided. It may herein be noted that the return wire 22 should be elastic or flexed in a manner to permit it to move with the semi-conductor 10 as the latter expands and contracts.

In Fig. 5 I have shown a suitable form of electrical circuit for the device described, in which the extent of the response is manifested by means of a bridge arrangement with a milliammeter MA. This instrument is bridged across two divider circuits, one formed by resistor 28.1 and variable resistor 30, and the other by a resistor 28.2 and by the probe according to the invention, which latter introduces the indicating or metering resistance R*m* and the fixed resistance R*f*. The variable resistor 30 provides a means for correlating the zero indication of the instrument with the desired minimum level of the liquid. Another variable resistor 32 is connected in series with the ammeter, providing for calibration thereof to the maximum level indication.

In Fig. 5 the heating coil 24 is shown as energized by a source of alternating current indicated at A*c*. If the balls are of high permeability magnetic material, heating with alternating current is advantageous as a varying flux is thus induced through the balls imparting to them a slight vibration which, while not affecting the overall conductivity of the system when the balls are either in contact or separated, does provide faster action and smoother response during the changeover, by overcoming inertia and providing fast makes and breaks.

Fig. 5 further indicates, similar to Fig. 2, the boundary line L, the constant probe resistance Rf and the metering resistance Rm which consists of the resistance increments constituted by the tube segments between the separated balls and indicated by Rs. The short circuiting connections provided by the contacting balls are indicated at s, and the open shunts due to the separated balls, are indicated at o.

Fig. 6 indicates a construction wherein all the wires to a probe P, which otherwise can be generally like that shown in Fig. 3, are cabled together to enter at the upper end of the probe so that no ground connection or return wire from the lower end is required.

The two wire coils 24.1 and 24.2 are wound side by side on the carrier tube 10. They are connected at screw plug 20 and are brought out separately, similarly to the single wire 26 shown in Fig. 3. It will be noted from Fig. 4 that the return wire 22 rests in a longitudinal groove of tube 10.

Fig. 6 shows a doubled over wire or two separate, equal resistance windings 24.1 and 24.2, wound around the tube 10 of the probe P as in Fig. 3 in the same manner as the single heater 24 is employed in the probe of Fig. 3. The lower ends of the heater coils where the wire is doubled and the lower end of the tube 10 are connected at a point marked 20 in the diagram which, as in Figs. 2 and 5, may be taken as representing the contact screw seen which is similarly marked in Fig. 3. Now if current is supplied to the heating coils in series, as indicated in Fig. 6, the voltage drop through each of them is maintained equal and the point 20 will be an effective voltage center tap of the heater with an A.-C. potential level halfway between points 38 and 40. The two coils 24.1 and 24.2 are connected to the secondary of the transformer Tr. The center tap 36 of the transformer will always be at the same potential level as the center tap 20 of the heater and serves thus as a connection to the indicating portion of the probe P, in lieu of point 20. By this method, a small resistance is added in the D.-C. indication circuit which can be calibrated out by means of variable resistances 30 and 32, but no unwanted A.-C. is developed in the indication circuit. The wire 16 to the top of the rod may take current from the battery shown in Fig. 6 in the same manner as from the battery B of Fig. 5, and the parts are connected with the milliammeter MA by the same arrangement of resistances, fixed and variable, as is illustrated in Fig. 5.

In one practical embodiment arranged as in Fig. 6 the rod was five-sixteenths, and the balls one-eighth of an inch in diameter. The resistance of the probe in air, with the heater energized and the balls separated, was about six times its resistance when entirely submerged, which values depended of course on the length of the probe rod. The secondary of the transformer Tr supplied six volts giving a potential of three volts on each heater coil 24.1 and 24.2. The resistances 28.1 and 28.2 were each 1500 ohms, the variable resistance 30 was 500 ohms and the variable resistance 32 was 2000 ohms. The indicating instrument was a zero to one milliampere meter. The battery was connected for six volts.

Fig. 7 shows another embodiment of the probe proper, with a metal shell for better protection, which at the same time permits the connection, with grounded return wire, from the top end of the probe.

In Fig. 7, a header for example of stainless steel, is indicated at 101. This header has an outside thread 111.1 for fastening it to the supporting structure, and an inside shoulder 101.2. A shell, shown as a stainless steel tube 129 is pressed into the threaded end of the header, the other end of which is closed for example by a plastic plug 102 held under pressure by the shoulder 101.2 and having holes for the lead wires 116 and 126 which are tightly gripped when the plug is pressed into the header. A disk 103 of stiff material for example Bakelite slidingly fits the bore of the header, has a shoulder fitting the casing 129, and two holes loosely accommodating the wires 126 and 116. A spring 105 is inserted between plug 102 and disk 103. Suitably fastened to the outside of the header is a terminal 122 for the connection 22 previously described.

Within the shell 129 is a tube 110 similar to tube 10 of Figs. 3 and 4 and carrying balls 114 as above described. I have found that bronze balls serve this purpose quite well, especially if plated with contact metal in order to provide a certain and well conducting contact. The ends of the carrier tube 110 are closed by threaded end pieces 111, 112 of metal, screwed into the tube 110. The upper end piece 111 is soldered or otherwise connected to wire 116 reaching it through the abovementioned holes of parts 102 and 103, the latter being pressed against end piece 111 by the spring 105. The first ball 114.1 is soldered to the end piece 111. The other end of the structure is closed by way of a suitable, such as a soft solder filler 130 which joins mechanically and conductively the shell 129, the end piece 112 and the tail 124.1 of the heating resistor 124. This coiled insulated and resistance wire 124 is embedded between the shell 129 and the ball carrier 110, preferably floating in silica grease. The upper end of this heater is connected to wire 126.

It will be evident that the above described probe can be electrically connected in a circuit according to Fig. 5, the solder filler 130 representing point 20, the shell 129 replacing wire 22 between filler 130 and terminal 122, and the terminal wires 116 and 126 leading to lines 16 and 26 of the circuit according to Fig. 5.

The spring 105 safely secures the detector tube 110 within the shell 129 while freely permitting relative expansion and contraction of tube and shell. In order not to impede this effect, the shoulder of disk 103 must be sufficiently high so as not to sit on the upper rim of the shell 129 when the carrier tube 110 assumes its minimum length with all balls touching each other.

I have stated previously that a source of heat is required for level indicators, and this is shown in Fig. 3 as a heater 24 in a separate circuit. Fig. 8 shows construction in which the heater is physically a part of the semi-conductor tube 10 and transmits heat thereto by conduction through the body of the material, although as will appear it is not in the portion of the semi-conductor laterally adjacent to the balls except when the tangential contacts between the balls have been broken. The numerals on Fig. 8 are duplicates to those of Fig. 3, where the parts are substantial duplicates, but it will be noted that the semi-conductor has an extension 10a above the level of the balls, and that an insulator 34 is interposed between the connector 18 and the uppermost ball of the series. This portion of the semi-conductor is above the high water mark as indicated by the line HW on the figure. Current is supplied to the contact 18 and the contact 20 is shown as grounded. The path of the current is thus through the semi-conductor in the region 10a, and then in series therewith through a path of variable resistance which, with the parts in the position illustrated in Fig. 8, is through the semi-conductor 10 above the waterline WL and through the balls below the waterline. The portion 10a of the semi-conductor is thus an external heater, the heat being transmitted to the rest of the semi-conductor 10 by conduction and serving to open the switches in the above-water portion of the rod, while the heat will be carried away from the submerged portion as already described in connection with Fig. 3. As the balls open near the upper end of the rod the adjacent portions of the rod become in effect a portion of the heater and supply heat to the portions lower down.

Fig. 9 is an electric diagram illustrating a method of connecting the probe shown in Fig. 8 in an alternating current circuit. The current is taken from the secondary of a transformer Tr, through a suitable loading resistance 42 to the probe P. The voltmeter V is connected in parallel with the probe and serves as an indicating instrument by way of measuring the voltage drop across the probe which is proportional to the number of contacts between balls and hence to the location of the boundary L relatively to the probe P.

In Fig. 8 the bottom of the probe P is shown grounded. Clearly, a ground connection from the contact 20 could be provided in the embodiment according to Fig. 2 instead of the expansible and contractable return wire 22 shown in Fig. 3. On the other hand such a return wire could be provided in Fig. 8.

I am aware that the invention may be embodied in other specific forms without departing from the spirit or essential attributes thereof, and I therefore desire the present embodiment to be considered in all respects as illustrative and not restrictive, as is in fact clear in several matters from the description itself. It will be particularly clear that devices incorporating the principle of my invention can be used not only for the purpose of determining the boundary between materials having different heat dissipation properties, such as the locating of a fluid level, but that boundaries between regions that are differentiated by way of other thermal properties can be detected in this manner.

For example the boundary between streams of one and the same fluid, but moving at different speed, or of different fluids, can be detected by means of probes of the herein described type; in that case the temperature differential between both sides of the L-line of the probe, as indicated in Figs. 2, 5, 6 and 9, will be caused by the different rate of heat convection in the two currents moving at different speed. Practical need of such measurements exists for example in the ventilating and airfoil testing technologies.

Another example of the utility of devices according to the invention, other than for indicating levels between masses of different heat capacity, is the detection of boundaries between zones at different temperatures of one and the same or different media, either moving or at rest. In that case the temperature differential between the two probe lengths on either side of the L-line is mainly caused directly by the temperature differential within the ambient. For this use, the above described "external" source of heat can be represented by the ambient proper. Practical need for such measurements exists for example in industrial heating.

It will now be evident that in many instances the boundary line will be determined by several factors, such as temperature or heat convection or both, as well as heat capacity differences in the respective zones. The probe according to the invention remains effective regardless of such combinations unless they balance each other exactly, which rare occurrence can be taken care of by an appropriate modification of the heat source that is built into the probe.

It should be understood that the present disclosure is for the purpose of illustration only and that this invention includes all modifications and equivalents which fall within the scope of the appended claims.

I claim:

1. In a device for manifesting an electrical response varying with the level of a liquid, a member for insection in the liquid transverse to the surface thereof, comprising: an elongated body of material of relatively low electrical conductivity and of pronounced linear expansion under heat; a linear series of small masses of relatively high electrical conductivity which are normally in contact with one another, at least certain of the masses being attached to said body by at least frictional engagement therewith so that the small masses receive motion therefrom and become mutually separated when the body expands linearly; means for passing a current through the series; and means for applying heat to the body along the length thereof; whereby the section of the elongated body which extends above the liquid is caused to expand, separating certain of the masses and increasing the resistance of the system.

2. In a device for manifesting an electrical response varying with the level of a liquid a member for insertion in the liquid transverse to the surface thereof, comprising: an elongated body of material; a linear series of small masses of conductive material which when touching provide pairs of contacts serially arranged, the masses having substantially greater electrical conductivity than the body, the body having a substantially greater coefficient of linear thermal expansion, and at least certain of the masses being in at least frictional engagement with said body by which they are suspended for relative movement of the small masses with the masses touching and separating dependent upon the degree of differential thermal expansion of the masses and the body; means for including said body with said masses in an electric circuit; and a heater extending lengthwise of said body for transmitting heat to the same throughout its length; whereby the section of the elongated body which extends above the liquid is caused to expand, separating certain of the masses and increasing the combined resistance of the body and the masses.

3. A device for manifesting an electrical response varying with the level of a liquid, comprising: an elongated body for insertion in the liquid transverse to the surface thereof; a linear series of small masses of conductive material which when touching provide pairs of contacts serially arranged, the masses having substantially greater electrical conductivity than the body, the body having a substantially greater coefficient of linear thermal expansion, and at least certain of the masses being in at least frictional engagement with said body by which they are suspended for relative movement of the small masses with the masses touching and separating dependent upon the degree of differential thermal expansion of the masses and the body; means for including said body with said masses in an electric circuit; and an electrical resistance heater at the upper end of the body above the liquid in heat-conducting relation to said body; whereby the sections of the elongated body which extends above the liquid is caused to expand, separating certain of the masses and increasing the combined resistance of the body and the masses.

4. In a device for manifesting an electrical response varying with a thermal boundary, an elongated member for insertion transverse of the boundary, comprising: a tubular body of material of relatively low electrical conductivity and having a relatively great coefficient of linear expansion under heat; and a series of metallic balls received in the tube and normally in contact with one another, being of a diameter slightly greater than the nominal internal diameter of the interior wall of the tube so that the balls indent that wall and receive motion from the tubular body and become mutually separated when the body expands linearly; whereby the section of the body which assumes a higher temperature than the remaining section is caused to separate its balls and thus to increase the resistance of the body with the balls to a degree indicating the relation of the sections and hence the location on the elongated member of the thermal boundary.

5. A device for manifesting an electrical response varying with the level of a body of liquid, comprising: an elongated body for insertion in the liquid transverse to the surface thereof; a linear series of small masses of conductive material which when touching provide pairs of contacts serially arranged, the masses having substantially greater electrical conductivity than the body, the body having a substantially greater coefficient of linear thermal expansion, and at least certain of the masses being in at least frictional engagement with said body by which they are suspended for relative movement of the small masses with the masses touching and separating dependent upon the degree of differential thermal expansion of the masses and the body; means for applying a voltage to the body; measuring means connected to said body responsive to the variation in resistance of the body; and heating means including two resistance coils extending lengthwise of the body and connected with one end of each coil to one end of the body, a source of electric energy, electrical connections from the other ends of the coils to said source to provide equalization of the voltage drop therein, whereby the section of the elongated body which extends above the liquid is caused to expand, separating certain of the masses and increasing the combined resistance of the body and the masses.

6. A device for manifesting an electrical response varying with the level of a body of liquid, comprising: an elongated member for insertion in the liquid transverse to the surface thereof; a plurality of normally closed thermostatic switches serially arranged along the length of said member; relatively high resistances for bridging each one of said switches; means for applying a current to said series of switches and resistances; means for measuring the resistance of said series; and means for supplying heat to said member throughout its length tending to open the switches; whereby the submerged switches remain closed because of the dissipation of heat by the liquid, and the level is indicated by the resistance of said series.

7. A device for manifesting an electrical response varying with the level of a body of liquid, comprising: an elongated member for insertion in the liquid transverse to the surface thereof and having between the ends thereof two conductors, one conductor of low electrical conductivity and the other conducctor including a series of conductor elements of higher conductivity each element being in heat transfer contact with said first conductor and each pair of elements being capable of assuming a variable conductivity therebetween depending on the heat transfer from the first conductor; means for passing a current through the conductors; means for measuring the resistance of the conductors; and means for supplying heat along the length of said member; whereby said heat is preferentially absorbed by the liquid from the submerged section of the member and the liquid level is indicated by the resistance as affected by said locally varied conductivity.

8. A device for electrically manifesting a boundary within a substance or between substances which boundary establishes two adjacent zones of different thermal characteristics on respective sides of said boundary comprising: an elongated probe member of a given electrical conductivity; carried on said probe member a series of bodies of an electrical conductivity higher than that of said probe member; the coefficient of linear thermal expansion of the probe member being substantially different from that of the bodies and a peripheral point of each one of said bodies being attached to a corresponding point of said elongated probe member such that in a first section of said probe member that extends within one of said zones the lengths between the points of attachment of adjacent bodies increase with a change of temperature in a given sense to cause said bodies to separate, and that in a second section of said probe member that extends within the other zone the lengths between the points of attachment of adjacent bodies decrease with a change of temperature in opposite sense to cause said bodies to contact; whereby the ratio of the electrical resistances of the respective sections is indicative of the location on said elongated member of said boundary between said zones.

9. A device according to claim 8 further comprising heating means in heat conductive relation to said probe member; whereby ambient zones of different heat capacity are differentiated as to their effect upon said sections of the heated probe member.

10. A device according to claim 9, wherein said heating means includes a resistance wire that extends along said probe member.

11. A device according to claim 9, wherein said heating means includes a section of said probe member.

12. A device according to claim 9, wherein said elongated probe member is a tube of synthetic semi-conductive material and said bodies are metal balls pressed against the inside wall of said tube; whereby said points of attachment are constituted by the frictional contact where the balls press against the tube.

13. A device according to claim 12, further comprising an electrical heating coil around said tube, a protective shell surrounding said coil, and electrical connections leading to the two outermost balls, to the tube, and to the heating coil.

14. A device according to claim 13, wherein said shell is of insulating material and said electrical connections include a wire leading within the shell to one of the ends of the heating coil and to the adjacent end of the tube.

15. A device according to claim 13, wherein said shell is of conductive material and at one end connected to the adjacent end of the heating coil and the adjacent outermost ball; whereby said shell serves as electrical connection to coil, balls and tube.

16. A device according to claim 13, further comprising spring means at one end of said shell for yieldingly securing said tube within the shell.

17. In a device for manifesting an electrical response varying with a thermal boundary, an elongated member for insertion transverse of the boundary, comprising: a metallic tubular header; a tubular metallic shell one end of which is fastened to one end of said header; within but clearing said shell a tubular body of material of relatively low electrical conductivity and having a relatively great coefficient of linear expansion under heat; a series of metallic balls received in the tube and normally in contact with one another, being of a diameter slightly greater than the nominal internal diameter of the interior wall of the tubes so that the balls indent that wall and receive motion from the tubular body and become mutually separated when the body expands linearly; a heating coil surrounding said tubular body within said clearing space between said body and said shell; a perforated disk slidably inserted in said header and clearing said shell body; a perforated plug closing the other end of said heater; spring means between said disk and said plug tending to move the disk and the tubular body towards the other end of said shell; electrically conductive plugging means at said other end of the shell for sealing the shell and for electrically connecting it to said coil and to the metallic ball at said end; a metallic connector fastened to said tubular body adjacent to said disk and contacting the metallic ball at that end; and wires leading from said coil and said connector through the perforations of said disk and of said plug; whereby said tubular body can freely expand while secured by said spring, permitting the section of the body which assumes a higher temperature than the remaining section to separate its balls and thus to increase the resistance of the body with the balls to a degree indicating the relation of the sections and hence the location on the elongated member of the thermal boundary.

References Cited in the file of this patent

UNITED STATES PATENTS

| | | |
|---|---|---|
| 2,688,872 | Hartline | Sept. 14, 1954 |
| 2,761,924 | Keeman | Sept. 4, 1956 |

FOREIGN PATENTS

| | | |
|---|---|---|
| 370,118 | Great Britain | Apr. 7, 1932 |
| 381,811 | Great Britain | Oct. 13, 1932 |